Figure 3:
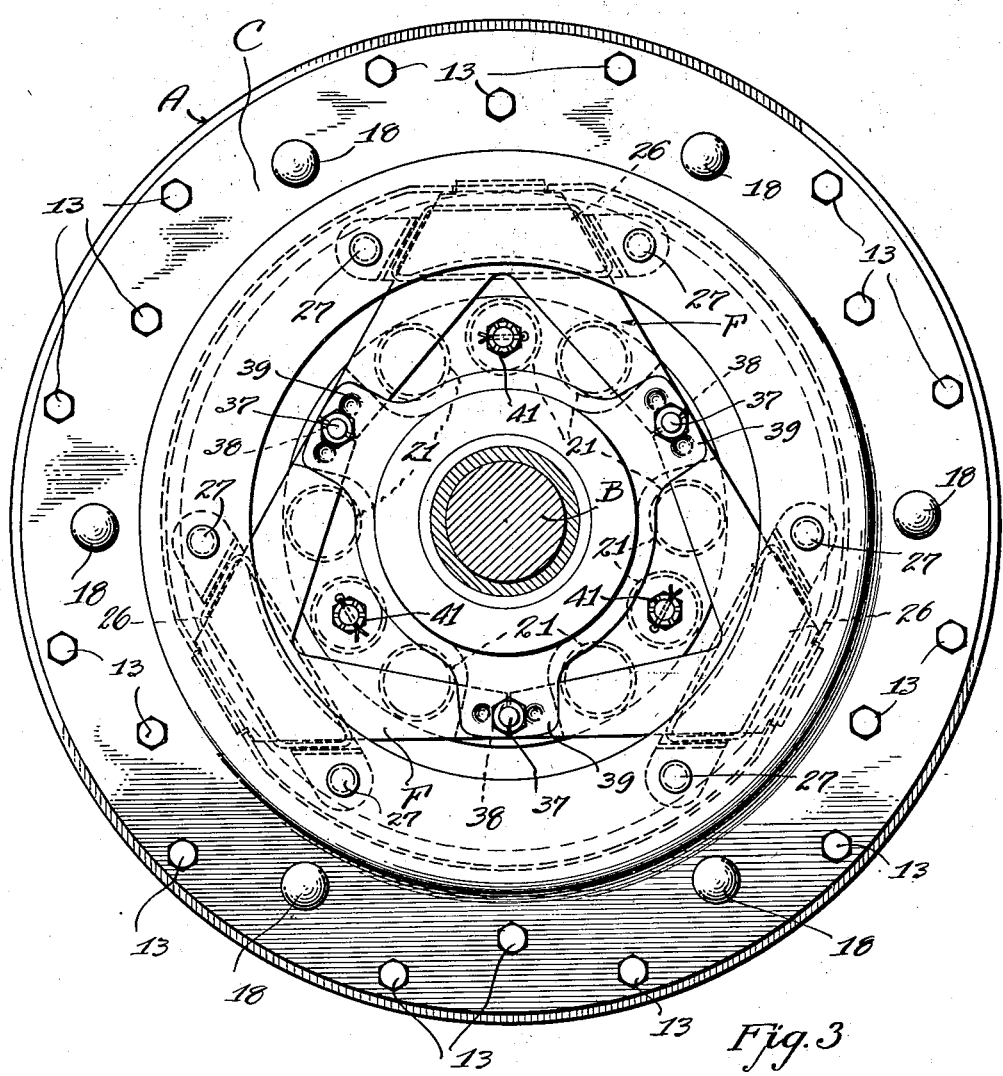

Feb. 13, 1934.　　　A. J. MEYER　　　1,947,214
CLUTCH
Filed July 6, 1931　　　2 Sheets-Sheet 1
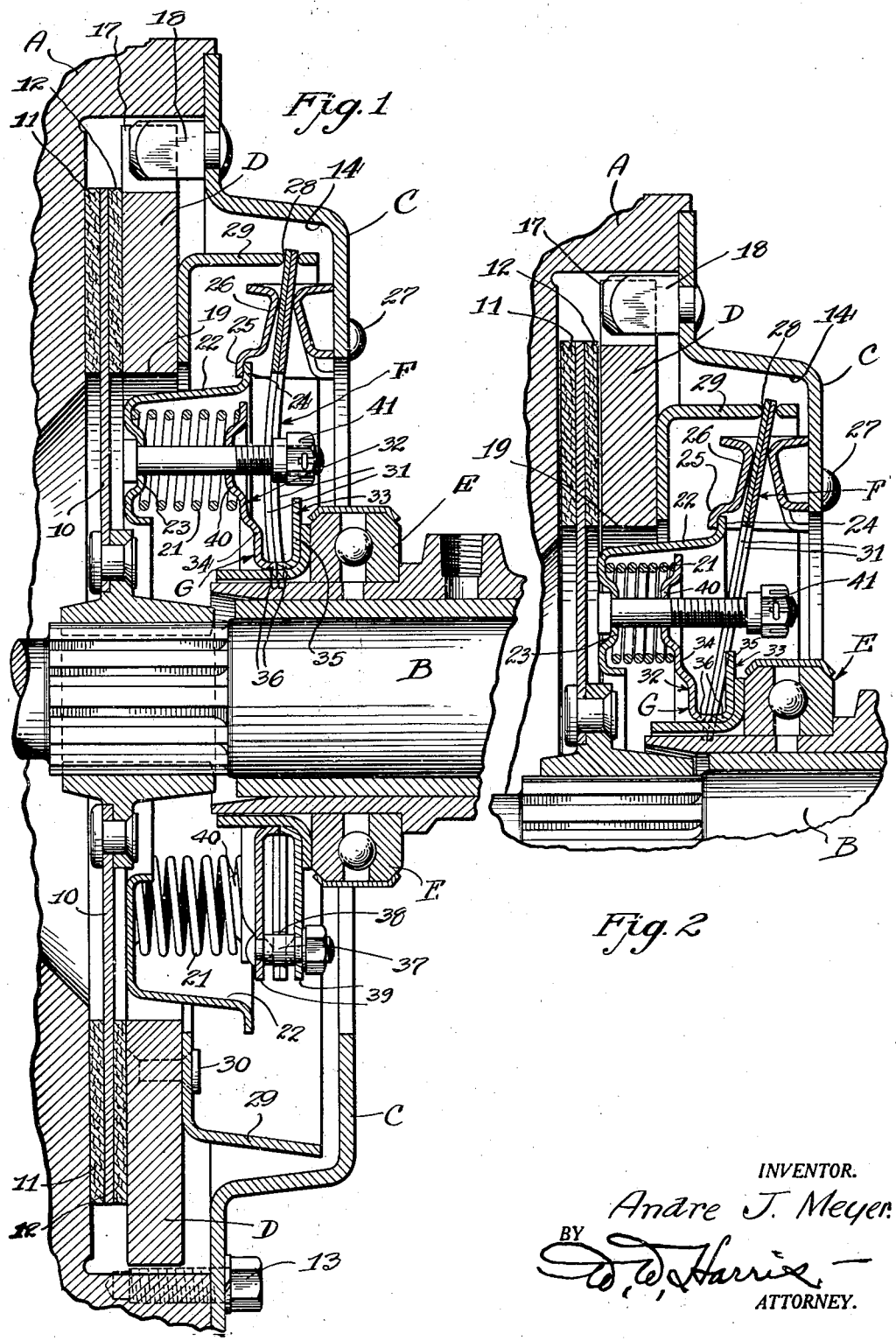
INVENTOR.
Andre J. Meyer.
BY
ATTORNEY.

Feb. 13, 1934.          A. J. MEYER          1,947,214
                          CLUTCH
                   Filed July 6, 1931          2 Sheets-Sheet 2

INVENTOR.
Andre J. Meyer.
BY
ATTORNEY.

Patented Feb. 13, 1934

1,947,214

UNITED STATES PATENT OFFICE 1,947,214

CLUTCH

Andre J. Meyer, Detroit, Mich., assignor to Continental Motors Corporation, Detroit, Mich., a corporation of Virginia Application July 6, 1931. Serial No. 548,795

15 Claims. (Cl. 192—68)

This invention relates to clutches of the type generally used in the automotive vehicle industry and has among its objects the provision of an improved clutch which will not grab or chatter during engagement.

A further object of the invention resides in the provision of a novel combination and arrangement of parts whereby the clutch is capable of manufacture at considerably less cost than heretofore, my improved clutch eliminating many of the parts heretofore used in clutches while at the same time obtaining an improved clutch action.

Further objects and advantages of my invention will be apparent from the following description of one embodiment of the invention.

Referring to the accompanying drawings:

Fig. 1 illustrates a sectional elevation view through the clutch as assembled with the usual flywheel and driven shaft, Fig. 2 is a sectional detail view illustrating the parts of the clutch when disengaged, and Fig. 3 is a rear elevation view of the clutch.

In the drawings, reference character A represents the usual engine flywheel or driving member, and B is the driven shaft or member, the latter having connected thereto the driven disc 10 having friction surfaces 11, 12 preferably of the plane face type. If desired these friction surfaces or mats 11, 12 may be of the well known warped or distorted form although one feature of my invention resides in the provision of a clutch operating mechanism which will not necessitate such distorted mats with the consequent elimination of spot wearing and the provision of a clutch disc which will operate efficiently over relatively long periods of use.

C is the cover plate attached to and driven by flywheel A by reason of the fastening devices 13, this cover opening inwardly of the clutch by reason of the cupped portion 14.

The pressure plate D is driven from the flywheel by reason of plate recesses 17 engaged by driving lugs 18 carried by cover C as shown in Figs. 1 and 2, the pressure plate being movable axially of shaft B during said drive. The pressure plate has an opening 19 through which shaft B extends.

Slidably mounted on shaft B is a collar or clutch releasing means E, this collar being urged outwardly by reason of the spring means 21 acting between the collar and the abutment 22. The spring means 21 illustrated is in the form of a plurality of coil springs spaced around shaft B and lying within recess 19. The springs 21 are located in position by the cupped portion 23 of abutment 22, the latter being in the form of an outwardly opening cup flanged at 24 for engagement with flanges 25 of lever fulcrums 26. The fulcrums are secured by rivets 27 within the cupped portion 14 of the cover plate. Thus springs 21 lie within the cupped abutment 22 which opens outwardly in telescoping relation with cover plate C.

Lever assemblies F have their inner ends around the shaft D and the outer ends located in slots 28 of thrust plate 29 secured at 30 to the pressure plate D.

The lever assemblies F in the illustrated embodiment of my invention are formed by a plurality of laminated spring steel sections 31 whereby these levers are capable of bending in order to transmit a uniformly increasing load from primary springs 21 to the pressure plate during clutch engagement.

One important feature of my invention resides in the manner in which the inner ends of the forked lever assemblies F are positioned with respect to the collar E. The collar E carries the lever positioning means or assembly G which is preferably composed of a pair of stampings 32, 33 each having radially extending annular flanges 34, 35 and flanges 36 at right angles with flanges 34, 35 to space flanges 34, 35 as illustrated to form a substantially U-shaped annular recess receiving the inner ends of the levers. Across flanges 34, 35, which are referred to as the legs of the U, are located at spaced points circumferentially of shaft B, the pins 37, and the lever ends are formed with recesses 38 for engagement around these pins. Adjacent levers have their adjacent forked ends recessed in complementary fashion whereby an adjacent pair substantially surround each pin 37. The flanges 34, 35 in the vicinity of the pins 37 are formed with outer projections 39 for receiving these pins. It will be noted that flange 34 is radially elongated and cupped at 40 at a series of circumferentially spaced points to receive and position the ends of springs 21 opposite the abutment portion 23, tie members 41 extending through springs 21 and cups 23, 40 to additionally position the springs and to limit separation of the clutch parts for convenient assembly or removal from the flywheel A and shaft B.

In operation, Fig. 2 illustrates the position of the parts when the clutch is disengaged. In Fig. 2 the collar E has been moved to the left from the Fig. 1 position, whereby the lever positioning assembly G has compressed springs 21 to unload lever assemblies F and thereby move thrust plate 29 and pressure plate D to the right.

Such movement causes disengagement between the pressure plate and driven disc 10 so as to interrupt the drive between the flywheel A and the driven shaft B.

When it is desired to establish the drive from the flywheel A to the shaft B, the collar E is released from the Fig. 2 position, whereupon springs 21 acting against the abutment 22 will urge assembly G and the inner ends of lever assemblies F to the right. During the first part of this movement the lever assemblies retain their substantially straight or unflexed form of Fig. 2 in moving about fulcrum 26 to move the pressure plate D into engagement with the disc 10 under substantially zero pressure.

As the collar E is further released to the right, the levers will be flexed whereby their inner ends will be moved through a relatively great distance or arc with respect to the movement of the outer ends of the levers in yieldingly transmitting the pressure from springs 21 to pressure plate D. When the collar E is fully released, as shown in Fig. 1, the pressure plate packs the disc 10 against flywheel A and the clutch is fully engaged.

It will thus be noted that the load is applied to the pressure plate in a substantially uniform manner from substantially zero pressure at the initial clutch engagement to the desired full pressure when the clutch is fully engaged.

What I claim as my invention is:

1. A clutch having in combination, a driving member, a driven shaft, a disc connected to the shaft, a pressure plate driven by said driving member and movable for engagement and disengagement with said disc, laminated levers adapted to move the pressure plate, said pressure plate having an opening through which said shaft extends, an abutment within said opening, and a plurality of springs spaced around said shaft operating intermediate said abutment and said levers.

2. A clutch having in combination, a driving member, a driven shaft, a disc connected to the shaft, a pressure plate driven by said driving member and movable for engagement and disengagement with said disc, levers adapted to move the pressure plate, said pressure plate having an opening through which said shaft extends, fulcrum means for said levers, an abutment within said opening, and a plurality of springs spaced around said shaft operating intermediate said abutment and said levers, and a cover plate resisting the thrust produced by said springs acting on said abutment, said abutment extending between said springs and said fulcrum means.

3. A clutch having in combination, a driving member, a driven shaft, a disc connected to the shaft, a pressure plate driven by said driving member and movable for engagement and disengagement with said disc, levers adapted to move the pressure plate, said pressure plate having an opening through which said shaft extends, an abutment within said opening, and a plurality of springs spaced around said shaft operating intermediate said abutment and said levers, lever fulcrums, a cover plate carrying said fulcrums, said abutment transmitting the thrust of said springs to said fulcrums.

4. A clutch having in combination, a driving member, a driven shaft, a disc connected to the shaft, a pressure plate driven by said driving member and movable for engagement and disengagement with said disc, levers adapted to move the pressure plate, said pressure plate having an opening through which said shaft extends, an abutment within said opening, and a plurality of springs spaced around said shaft operating intermediate said abutment and said levers, an inwardly opening cupped cover, said abutment being substantially cup-shaped and being telescopically arranged relative to said cover.

5. In a clutch having in combination, driving and driven members, relatively movable driving and driven means respectively connected to said driving and driven members, levers adapted to operate said driving means relatively to said driven means, said levers having their ends surrounding said driven member, and a lever positioning structure substantialy U-shaped in cross-section surrounding said driven member and comprising flanged plates spaced to provide an annular recess receiving the lever inner ends, an abutment, one of said plates having circumferentially spaced extensions, and a plurality of springs spaced around said driven member and located intermediate said abutment and said plate extensions respectively.

6. In a clutch having in combination, driving and driven members, relatively movable driving and driven means respectively connected to said driving and driven members, levers adapted to operate said driving means relatively to said driven means, said levers having their ends surrounding said driven member, and a lever positioning structure surrounding said driven member and comprising flanged plates spaced to provide an annular recess receiving the lever inner ends, an abutment, one of said plates having circumferentially spaced extensions, and a plurality of springs spaced around said driven member and located intermediate said abutment and one of said plates, said abutment and said plate extensions being formed with spring locating cupped portions.

7. In a clutch having in combination, driving and driven members, relatively movable driving and driven means respectively connected to said driving and driven members, levers adapted to operate said driving means relatively to said driven means, said levers having their ends surrounding said driven member, and a lever positioning structure surrounding said driven member and comprising flanged plates spaced to provide an annular recess receiving the lever inner ends, an abutment, and a plurality of springs spaced around said driven member and located intermediate said abutment and one of said plates, and a plurality of pins bridging said plates for engagement with said levers.

8. In a clutch having in combination, driving and driven members, relatively movable driving and driven means respectively connected to said driving and driven members, levers adapted to operate said driving means relatively to said driven means, said levers having their ends surrounding said driven member, and a lever positioning structure surrounding said driven member and comprising flanged plates spaced to provide an annular recess receiving the lever inner ends, an abutment, and a plurality of springs spaced around said driven member and located intermediate said abutment and one of said plates, and a plurality of pins bridging said plates for engagement with said levers, said levers being recessed for engagement with said pins.

9. A clutch having in combination, a driving member, a driven shaft, a disc connected to the shaft, a pressure plate driven by said driving member and movable for engagement and disengagement with said disc, levers adapted to move the pressure plate, said pressure plate having an opening through which said shaft extends, an abutment within said opening and a plurality of springs spaced around said shaft operating intermediate said abutment and said levers, said levers having their inner ends flexed to transmit substantially uniformly increasing pressure to the pressure plate under load from said springs.

10. A clutch having in combination, a driving member, a driven shaft, a disc connected to the shaft, a pressure plate driven by said driving member and movable for engagement and disengagement with said disc, levers adapted to move the pressure plate, said pressure plate having an opening through which said shaft extends, an abutment within said opening and a plurality of springs spaced around said shaft operating intermediate said abutment and said levers, said levers formed of laminated spring material.

11. In a clutch having in combination, driving and driven members, relatively movable driving and driven means respectively connected to said driving and driven members, levers adapted to operate said driving means relatively to said driven means, said levers having their ends surrounding said driven member, and a lever positioning structure surrounding said driven member and comprising flanged plates spaced to provide an annular recess receiving the lever inner ends, an abutment, and a plurality of springs spaced around said driven member and located intermediate said abutment and one of said plates, said levers having their inner ends flexed to transmit substantially uniformly increasing pressure to the pressure plate under load from said springs.

12. In a clutch having in combination, driving and driven members, relatively movable driving and driven means respectively connected to said driving and driven members, levers adapted to operate said driving means relatively to said driven means, said levers having their ends surrounding said driven member, and a lever positioning structure surrounding said driven member and comprising flanged plates spaced to provide an annular recess receiving the lever inner ends, an abutment, and a plurality of springs spaced around said driven member and located intermediate said abutment, and one of said plates, said levers formed of laminated spring material and having their inner ends flexed to transmit substantially uniformly increasing pressure to the pressure plate under load from said springs.

13. A clutch having in combination, a driving member, a driven shaft, a disc connected to the shaft, a pressure plate driven by said driving member and movable for engagement and disengagement with said disc, levers adapted to move the pressure plate, said pressure plate having an opening through which said shaft extends, an abutment within said opening, and a plurality of springs spaced around said shaft operating intermediate said abutment and said levers, a plate intermediate said levers and said springs, and a tie member between said plate and abutment limiting separation thereof.

14. In a clutch having in combination, driving and driven members, relatively movable driving and driven means respectively connected to said driving and driven members, levers adapted to operate said driving means relatively to said driven means, said levers having their ends surrounding said driven member, and a lever positioning structure surrounding said driven member and comprising flanged plates spaced to provide an annular recess receiving the lever ends, an abutment, and a plurality of springs spaced around said driven member and located intermediate said abutment and one of said plates, and a tie member intermediate the abutment and the last said plate limiting separation thereof.

15. A clutch having in combination, a driving member, a driven shaft, a disc connected to the shaft, a pressure plate driven by said driving member and movable for engagement and disengagement with said disc, levers adapted to move the pressure plate, said pressure plate having an opening through which said shaft extends, an abutment within said opening, and a plurality of springs spaced around said shaft operating intermediate said abutment and said levers, said abutment being substantially cup-shaped to receive said springs therewithin.

ANDRE J. MEYER.